(12) United States Patent
Aluru

(10) Patent No.: US 12,488,514 B2
(45) Date of Patent: Dec. 2, 2025

(54) SYSTEM AND METHOD FOR SIMULATING VEHICLE DISPLAY

(71) Applicant: GM Global Technology Operations LLC, Detroit, MI (US)

(72) Inventor: Sai Vishnu Aluru, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 154 days.

(21) Appl. No.: 18/483,023

(22) Filed: Oct. 9, 2023

(65) Prior Publication Data

US 2025/0117979 A1    Apr. 10, 2025

(51) Int. Cl.
   *G09G 3/20*    (2006.01)
   *G06T 11/00*   (2006.01)

(52) U.S. Cl.
   CPC .............. *G06T 11/001* (2013.01); *G09G 3/20* (2013.01); *G09G 2320/0673* (2013.01); *G09G 2320/0693* (2013.01); *G09G 2360/16* (2013.01); *G09G 2380/10* (2013.01)

(58) Field of Classification Search
   CPC . G06T 11/001; G06T 7/80; G09G 2320/0673; G09G 2320/0693; G09G 2360/16; G09G 2380/10; G09G 5/06; G09G 5/02
   See application file for complete search history.

(56) References Cited

U.S. PATENT DOCUMENTS

| | | | |
|---|---|---|---|
| 10,996,471 B2 * | 5/2021 | Naruse | B60R 1/24 |
| 11,705,029 B1 | 7/2023 | Zhang et al. | |
| 11,790,818 B2 * | 10/2023 | Su | G09G 3/006 |
| | | | 345/204 |
| 2020/0335040 A1 | 10/2020 | Nho et al. | |
| 2021/0209992 A1 * | 7/2021 | Seder | G09G 3/2007 |

* cited by examiner

*Primary Examiner* — Antonio A Caschera
(74) *Attorney, Agent, or Firm* — Honigman LLP; Matthew H. Szalach; Jonathan P. O'Brien

(57) ABSTRACT

A computer-implemented method is executed by data processing hardware of a display calibration system in communication with a camera system of a motor vehicle that has a vehicle display. The method includes computing a first gamma value for a vehicle display based on at least one display specification or a vehicle statistic. Additionally, the method includes receiving a display look-up table, which is modified based on the computed first gamma value to generate a transformation look-up table. Image data from the camera system is received, and the transformation look-up table is applied to the image data to generate transformed image data. Simulated image data is generated based on the transformed image data, and this simulated image data is rendered at a display of the display calibration system. The rendered display corresponds to the vehicle display.

20 Claims, 2 Drawing Sheets

SYSTEM AND METHOD FOR SIMULATING VEHICLE DISPLAY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to a system and method for simulating a vehicle display, such as a vehicle camera display screen of an infotainment system.

Modern vehicles often include one or more camera systems equipped on an exterior of the vehicle to assist a driver in observing the environment surrounding the vehicle. The vehicle camera system generates image data and transmits such image data to one or more displays or graphical user interfaces (e.g., infotainment system) incorporated within a passenger compartment of the vehicle. Vehicle displays are typically unique to a particular vehicle design and/or manufacturer. Vehicle display image parameters may differ from image parameters of conventional displays, such as laptops or desktop displays. Accordingly, vehicle displays often must be uniquely calibrated or tuned to accurately depict the image data generated by the vehicle camera system. Calibrating the vehicle display may include an iterative process of adjusting the camera system image parameters and then viewing the image output on the vehicle display to validate whether the displayed images satisfy desired image quality thresholds. This calibration process may requires several iterations of adjustment and validation.

SUMMARY

An aspect of the disclosure provides a computer-implemented method that, when executed by data processing hardware of a display calibration system in communication with a camera system of a motor vehicle having a vehicle display, causes the data processing hardware to perform operations. The operations include computing a first gamma value for the vehicle display based on at least one of a display specification or a vehicle statistic, receiving a display look-up table, modifying the display look-up table based on the computed first gamma value to generate a transformation look-up table, receiving image data from the camera system, applying the transformation look-up table to the image data to generate transformed image data, generating simulated image data based on the transformed image data, and rendering the simulated image data at a display of the calibration system, whereby the rendered display corresponds to the vehicle display.

Implementations of the disclosure may include one or more of the following optional features. In some implementations, the vehicle statistic includes at least one of an active display duration and a vehicle lifecycle value and the display specification includes a display white point drop percentage look-up table. In some examples, the operations include receiving a display gamma look-up table and a display white point look-up table for the vehicle display. In some configurations, modifying the display look-up table includes modifying at least one of the display gamma look-up table and the display white point look-up table based on the computed first gamma value.

In some additional even further implementations, the operations include modifying a camera look-up table based on the modified display look-up table. In some examples, the operations include, prior to generating the simulated image data, calculating pixel values for the image data and separating the image data into a red layer, a blue layer, and a green layer. In some configurations, the operations include, after generating the transformed image data, concatenating the red layer, the blue layer, and the green layer to generate simulated image data.

Another aspect of the disclosure provides a calibration system for validating image data received from a camera system of a vehicle for rendering on a vehicle display. The calibration system includes a display, data processing hardware, and memory hardware in communication with the data processing hardware. The memory hardware stores instructions that when executed on the data processing hardware cause the data processing hardware to perform operations. The operations include computing a first gamma value for the vehicle display based on at least one of a display specification or a vehicle statistic, receiving a display look-up table, modifying the display look-up table based on the computed first gamma value to generate a transformation look-up table, receiving image data from the camera system, applying the transformation look-up table to the image data to generate transformed image data, generating simulated image data based on the transformed image data, and rendering the simulated image data at a display of the calibration system. The rendered display corresponds to the vehicle display.

This aspect of the disclosure may include one or more of the following optional features. In some implementations, the vehicle statistic includes at least one of an active display duration and a vehicle lifecycle value. The display specification includes a display white point drop percentage look-up table. In some examples, the operations include receiving a display gamma look-up table and a display white point look-up table for the vehicle display. In some configurations, modifying the display look-up table includes modifying at least one of the display gamma look-up table and the display white point look-up table based on the computed first gamma value.

In some implementations, the operations include modifying a camera look-up table based on the modified display look-up table. In some examples, the operations include, prior to generating the transformed image data, calculating pixel values for the image data and separating the image data into a red layer, a blue layer, and a green layer. In some configurations, the operations include, after generating the transformed image data, concatenating the red layer, the blue layer, and the green layer to generate simulated image data.

Yet another aspect of the disclosure provides a user device for validating image data received from a camera system of a vehicle for rendering on a vehicle display. The user device includes a display, data processing hardware in communication with the display, and memory hardware in communication with the data processing hardware. The memory hardware stores instructions that when executed on the data processing hardware cause the data processing hardware to perform operations. The operations include computing a first gamma value for the vehicle display based on at least one of a display specification or a vehicle statistic, receiving a display look-up table, modifying the display look-up table based on the computed first gamma value to generate a transformation look-up table, applying the transformation look-up table to the image data to generate transformed image data, generating simulated image data based on the transformed image data, and rendering the simulated image data at the display of the user device. The rendered display corresponds to the vehicle display.

This aspect of the disclosure may include one or more of the following optional features. In some implementations, the vehicle statistic includes at least one of an active display duration and a vehicle lifecycle value and the display specification includes a display white point drop percentage look-up table. In some examples, the operations include receiving a display gamma look-up table and a display white point look-up table for the vehicle display. In some configurations, modifying the display look-up table includes modifying at least one of the display gamma look-up table and the display white point look-up table based on the computed first gamma value.

In some implementations, the operations include modifying a camera look-up table based on the modified display look-up table. In some examples, the operations include, prior to generating the transformed image data, calculating pixel values for the image data and separating the image data into a red layer, a blue layer, and a green layer.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
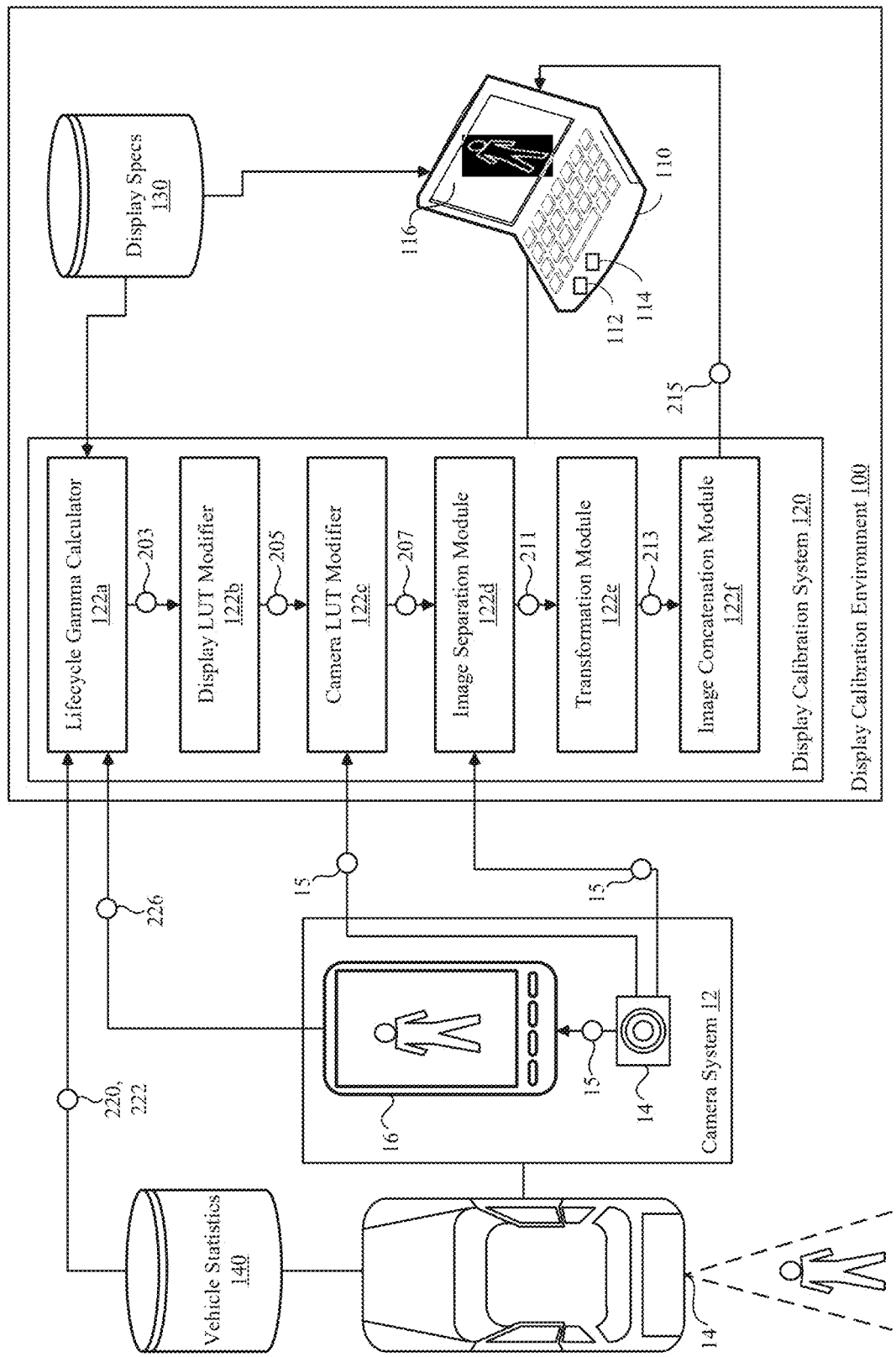
FIG. 1 is a schematic view of an example of a vehicle calibration environment according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, an example display calibration environment 100 is provided according to the present disclosure. The display calibration environment 100 is configured for use in calibrating the display of image data generated by one or more cameras 14 of a vehicle camera system 12 and transmitted to a graphical user interface or vehicle display 16 of the vehicle 10. In the illustrated example, the display calibration environment 100 is represented schematically and includes a calibration device 110 including a controller 112 (e.g., data processing hardware), memory hardware 114, and a display 116. In some examples, the calibration device 110 may include a computer system, such as a laptop. In other examples, the display calibration system 120 may be at least partially hosted on a cloud computing system and accessed over a network.

As discussed in greater detail below, the display calibration environment 100 includes a display calibration system 120 executed or hosted on the calibration device 110. The display calibration system 120 includes a plurality of calibration modules 122, 122a-122f each operable to execute one or more operations of the display calibration system 120. As shown in FIG. 1, the calibration modules 122 include a lifecycle gamma calculator 122a configured to compute a gamma value for the vehicle display 16 based on a lifecycle value of the vehicle 10 or the vehicle display 16, a display look-up table (LUT) modifier 122b, a camera LUT modifier 122c, an image separation module 122d, an image transformation module 122e, and an image concatenation module 122f—the operations of each of which will be described in greater detail below. The calibration device 110 may further include or communicate with one or more storage devices 130, 140 including display specifications 130 and vehicle statistics 140.

Figure 2:
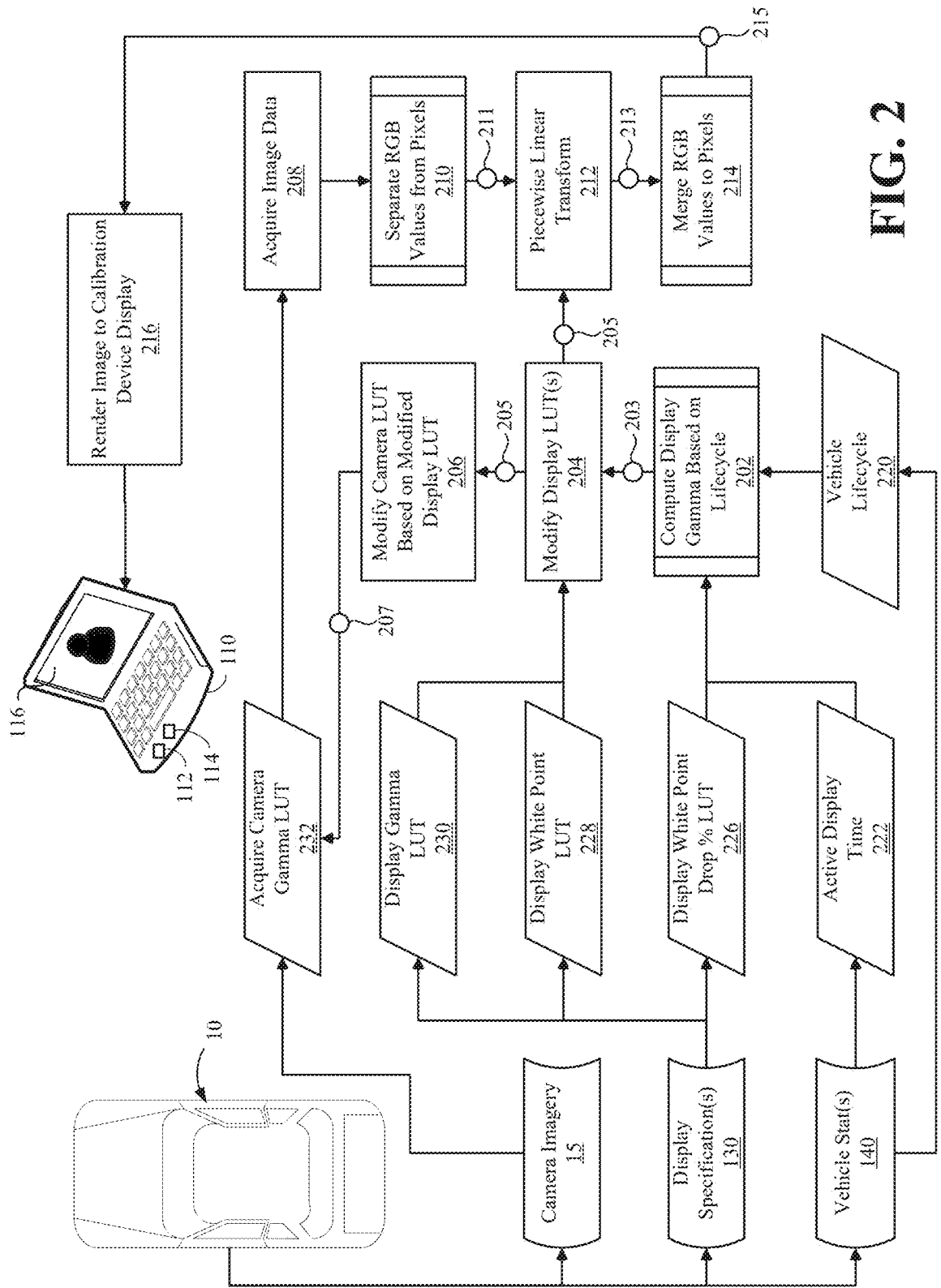
FIG. 2 is an example order of operations executed by the vehicle calibration environment to calibrate a vehicle display.

Referring to FIG. 2, an example of the operation of the display calibration environment 100 is provided. While the operations of the display calibration environment 100 are described sequentially here, it should be appreciated that various operations may be executed in parallel or in orders other than as described herein.

At an initial operation 202, the lifecycle gamma calculator 122a obtains each of a vehicle lifecycle value 220, an active display duration value 222, and a white point drop percentage look-up table (LUT) 224 for computing a gamma value of the display. For clarity, white point drop refers to a total brightness of the vehicle display 16 when all display pixels are set to display a white color. In this example, the vehicle lifecycle value 220 may be a total number of ignition cycles associated with the vehicle 10, which may be obtained from the vehicle statistics storage 140 of the vehicle 10. In other examples, the vehicle lifecycle value 220 may include a time duration associated with the vehicle operation, such as an engine-on time duration. The active display duration value 222 includes a time duration corresponding to the aggregate duration of time that the vehicle display 16 has been active (i.e., powered on). Using the vehicle lifecycle value 220, the active display duration value 222, and the white point drop percentage LUT 226, the lifecycle gamma calculator 122a computes a gamma value for the vehicle display 16 at operation 202. In other words, the gamma value for the vehicle display 16 may be dependent on the age or usage of the vehicle display 16 and may change based on the age or usage. By computing a current gamma value for the vehicle display 16, the vehicle display system 120 provides an accurate baseline for generating a simulated display 116 of the image data 15 at the calibration device 110.

In another operation 204, the display calibration system 120 obtains various display parameter values 228, 230 from the display specification storage 130 and modifies one or more look-up tables (LUTs) associated with the vehicle display 16. In some instances, the display specification storage 130 may be stored locally at the display calibration environment 100 (e.g., at the calibration device 110). In other examples, the display specification storage 130 may be integrated into, and obtained from, the vehicle display 16. For example, the vehicle display 16 may be provided with memory hardware that is pre-configured with the display specifications by the vehicle display manufacturer. At operation 204, the display calibration system 120 obtains a white point LUT 228 and a gamma LUT 230 for the vehicle display 16. The white point LUT 228 and the gamma LUT 230 are pre-defined specifications dependent on the particular vehicle display 16. For example, a first model of vehicle display 16 may have a first white point LUT 228 and a first gamma LUT 230 while a different model of vehicle display 16 may have a different, second white point LUT 228 and second gamma LUT 230. The white point LUT 228 and the gamma LUT 230, as well as the computed display gamma 203, are evaluated by the display LUT modifier 122b to generate one or more modified display LUT(s) 205. In some examples, the modified display LUT(s) 205 may include a piece-wise gamma transformation LUT 205.

At operation 206, the display calibration system 120 receives the modified display LUT(s) 205 and generates a modified camera LUT 207 based on the modified display LUT(s) 205. For example, the camera LUT modifier 122c obtains a pre-defined camera LUT 18 based on the specifications of the camera 14, which may be provided by the camera manufacturer. At operation 208, the display calibration system 120 acquires the image data 15 from the one or more vehicle cameras 14. The image data 15 includes specifications associated with a camera gamma LUT 232.

At operation 210, the image separation module 122d of the display calibration system 120 receives the acquired image data 15 and performs steps to determine individual pixel values for the image data 15. The image separation module 122d further separates the image data 15 into a red (R) layer, a green layer (G), and a blue (B) layer, thereby creating separated image data 211. The separated image data 211 including the pixel values and the R, G, and B layers is forwarded to the transformation module 122e, which executes a piecewise linear transformation at operation 212 using the computed piece-wise gamma transformation LUT 205 provided at operation 204. Upon transformation of the separated image data 211, the transformation module 122e transmits the transformed image data 213 to the image concatenation module 122f, which recombines the transformed R, G, and B layers at operation 214 to generate simulated image data 215 associated with image data 15. The simulated image data 215 is then rendered to the display 116 of the calibration device 110 at operation 216.

In addition to integrating camera and display gammas, as well as integrating black point, white point, and contrast ratios in real-time, it is possible to simulate a target image for any display on a secondary display having different display specifications. This approach provides accurate simulation of any target displayed image, enabling precise control of image contrast, brightness, and color rendition without the presence of physical hardware (e.g., the vehicle display). The approach also provides a comprehensive solution to simulate any target displayed image, providing an efficient means of accurately tuning image quality at a system level prior to implementation into the vehicle 10. Accordingly, by simulating image rendering of the vehicle display 16 via the display 116 of the calibration device 110, engineers can calibrate and validate image quality at a remote location independent of the vehicle 10. Over a wide range of vehicles 10 and vehicle display 16 types, the display calibration system 120 provides a single interface for calibrating a wide range of displays without the need to access each vehicle 10, thereby significantly reducing the time associated with validation and vehicle integration.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:
1. A computer-implemented method that, when executed by data processing hardware of a display calibration system in communication with a camera system of a motor vehicle having a vehicle display, causes the data processing hardware to perform operations comprising:

computing a first gamma value for the vehicle display based on at least one of a display specification or a vehicle statistic;
receiving a display look-up table;
modifying the display look-up table based on the computed first gamma value to generate a transformation look-up table;
receiving image data from the camera system;
applying the transformation look-up table to the image data to generate transformed image data;
generating simulated image data based on the transformed image data; and
rendering the simulated image data at a display of the calibration system, whereby the rendered display corresponds to the vehicle display.

2. The method of claim 1, wherein the vehicle statistic includes at least one of an active display duration and a vehicle lifecycle value and the display specification includes a display white point drop percentage look-up table.

3. The method of claim 2, wherein the operations further comprise receiving a display gamma look-up table and a display white point look-up table for the vehicle display.

4. The method of claim 3, wherein modifying the display look-up table includes modifying at least one of the display gamma look-up table and the display white point look-up table based on the computed first gamma value.

5. The method of claim 4, wherein the operations further comprise modifying a camera look-up table based on the modified display look-up table.

6. The method of claim 5, wherein the operations further comprise, prior to generating the simulated image data, calculating pixel values for the image data and separating the image data into a red layer, a blue layer, and a green layer.

7. The method of claim 6, wherein the operations further comprise, after generating the transformed image data, concatenating the red layer, the blue layer, and the green layer to generate simulated image data.

8. A calibration system for validating image data received from a camera system of a vehicle having a vehicle display, the calibration system comprising:
a display,
data processing hardware; and
memory hardware in communication with the data processing hardware, the memory hardware storing instructions that when executed on the data processing hardware cause the data processing hardware to perform operations comprising:
computing a first gamma value for the vehicle display based on at least one of a display specification or a vehicle statistic;
receiving a display look-up table;
modifying the display look-up table based on the computed first gamma value to generate a transformation look-up table;
receiving image data from the camera system;
applying the transformation look-up table to the image data to generate transformed image data;
generating simulated image data based on the transformed image data; and
rendering the simulated image data at the display of the calibration system, whereby the rendered display corresponds to the vehicle display.

9. The system of claim 8, wherein the vehicle statistic includes at least one of an active display duration and a vehicle lifecycle value and the display specification includes a display white point drop percentage look-up table.

10. The system of claim 9, wherein the operations further comprise receiving a display gamma look-up table and a display white point look-up table for the vehicle display.

11. The system of claim 10, wherein modifying the display look-up table includes modifying at least one of the display gamma look-up table and the display white point look-up table based on the computed first gamma value.

12. The system of claim 11, wherein the operations further comprise modifying a camera look-up table based on the modified display look-up table.

13. The system of claim 12, wherein the operations further comprise, prior to generating the transformed image data, calculating pixel values for the image data and separating the image data into a red layer, a blue layer, and a green layer.

14. The system of claim 13, wherein the operations further comprise, after generating the transformed image data, concatenating the red layer, the blue layer, and the green layer to generate simulated image data.

15. A user device for validating image data received from a camera system of a vehicle having a vehicle display, the user device comprising:
a display;
data processing hardware in communication with the display; and
memory hardware in communication with the data processing hardware, the memory hardware storing instructions that when executed on the data processing hardware cause the data processing hardware to perform operations comprising:
computing a first gamma value for the vehicle display based on at least one of a display specification or a vehicle statistic;
receiving a display look-up table;
modifying the display look-up table based on the computed first gamma value to generate a transformation look-up table;
applying the transformation look-up table to the image data to generate transformed image data;
generating simulated image data based on the transformed image data; and
rendering the simulated image data at the display of the user device, whereby the rendered display corresponds to the vehicle display.

16. The user device of claim 15, wherein the vehicle statistic includes at least one of an active display duration and a vehicle lifecycle value and the display specification includes a display white point drop percentage look-up table.

17. The user device of claim 16, wherein the operations further comprise receiving a display gamma look-up table and a display white point look-up table for the vehicle display.

18. The user device of claim 17, wherein modifying the display look-up table includes modifying at least one of the display gamma look-up table and the display white point look-up table based on the computed first gamma value.

19. The user device of claim 18, wherein the operations further comprise modifying a camera look-up table based on the modified display look-up table.

20. The user device of claim 19, wherein the operations further comprise, prior to generating the transformed image data, calculating pixel values for the image data and separating the image data into a red layer, a blue layer, and a green layer.

* * * * *